US012353455B2

United States Patent
Ross et al.

(10) Patent No.: US 12,353,455 B2
(45) Date of Patent: Jul. 8, 2025

(54) SEARCH RESULTS FOR PSEUDO-CONTENT

(71) Applicant: Scribd, Inc., San Francisco, CA (US)

(72) Inventors: Matthew Allen Strong Ross, London (CA); Azadeh Haji Hosseini, Toronto (CA); Monique Alves Cruz, Toronto (CA); Albert Jimenez Sanfiz, Toronto (CA); Prabhdeep Singh Cheema, Dublin, CA (US); Hima Kiran Alladi, Missouri City, TX (US)

(73) Assignee: Scribd, Inc., San Francisco, CA (US)

( * ) Notice: Subject to any disclaimer, the term of this patent is extended or adjusted under 35 U.S.C. 154(b) by 0 days.

(21) Appl. No.: 18/621,820

(22) Filed: Mar. 29, 2024

(65) Prior Publication Data

US 2024/0296179 A1    Sep. 5, 2024

Related U.S. Application Data

(63) Continuation-in-part of application No. 18/117,271, filed on Mar. 3, 2023.

(60) Provisional application No. 63/455,775, filed on Mar. 30, 2023.

(51) Int. Cl.
*G06F 16/334* (2025.01)
*G06F 16/335* (2019.01)

(52) U.S. Cl.
CPC .......... *G06F 16/334* (2019.01); *G06F 16/335* (2019.01)

(58) Field of Classification Search
CPC .... G06F 16/334; G06F 16/335; G06F 18/213; G06F 18/23; G06F 40/30; G06F 16/35
See application file for complete search history.

(56) References Cited

U.S. PATENT DOCUMENTS

| 8,438,469 B1 | 5/2013 | Scott et al. | |
| 8,515,908 B2* | 8/2013 | Kumar | G06F 16/3334 |
| | | | 707/759 |
| 8,688,669 B1* | 4/2014 | Bernstein | G06F 16/9535 |
| | | | 707/705 |
| 9,444,940 B2* | 9/2016 | Skiba | H04M 3/5233 |
| 10,146,852 B1* | 12/2018 | Chu | G06F 16/9538 |

(Continued)

OTHER PUBLICATIONS

Extended European Search Report received in European application No. 24167943.0, mailed on Aug. 6, 2024.

*Primary Examiner* — Jorge A Casanova
(74) *Attorney, Agent, or Firm* — Cognition IP, P.C.; Edward Steakley; Rajesh Fotedar (57) ABSTRACT

Various embodiments of a Title Engine generate search results that identify content available in a content corpus in response to receiving a search query for content that is currently unavailable in the content corpus. Rather than returning output merely indicating absence of the requested content set forth in the received search query, the Title Engine identifies various content available in the content corpus that is similar to the search query's requested—but unavailable—content. The Title Engine identifies content in a content corpus that is similar to requested content that has been determined as unavailable. Upon determining unavailability of the requested particular content in the content corpus, the Title Engine generates a pseudo-identifier for the requested particular content. The Title Engine inserts the pseudo-identifier into a sequence of content identifiers. The Title Engine generates an embedding for the pseudo-identifier.

14 Claims, 7 Drawing Sheets

(56) References Cited

U.S. PATENT DOCUMENTS

| | | |
|---|---|---|
| 11,294,974 B1 | 4/2022 | Shukla et al. |
| 2007/0016848 A1 | 1/2007 | Rosenoff et al. |
| 2008/0222125 A1* | 9/2008 | Chowdhury ........ G06F 16/9535 |
| 2013/0054583 A1* | 2/2013 | Macklem ................ G06F 16/22 |
| | | 707/723 |
| 2014/0316890 A1* | 10/2014 | Kagan ................ G06Q 30/0275 |
| | | 705/14.54 |
| 2015/0161192 A1* | 6/2015 | Scoles ................. G06F 16/2322 |
| | | 707/725 |
| 2015/0161202 A1* | 6/2015 | Shapira ................. G06F 16/235 |
| | | 707/723 |
| 2020/0004886 A1* | 1/2020 | Ramanath ............. G06F 16/248 |

* cited by examiner

SEARCH RESULTS FOR PSEUDO-CONTENT

CROSS-REFERENCE TO RELATED APPLICATIONS

This application claims priority to U.S. Provisional Patent Application No. 63/455,775 entitled "Search Results for Pseudo-Content," filed on Mar. 30, 2023, the entirety of which is incorporated by reference.

This application claims priority to, and is a Continuation-in-Part of, U.S. patent application Ser. No. 18/117,271 entitled "Semantic Clustering Based on User Interactions for Content Moderation," filed on Mar. 3, 2023, the entirety of which is incorporated by reference.

BACKGROUND

In the field of computer science, artificial intelligence ("A.I.") networks, such as neural networks and deep learning networks, are increasingly being employed to solve a variety of tasks and challenging problems. Such A.I. networks can consist of layers of computational graphs with nodes representing computational operations and connections in between those operations and/or computational graphs with filters representing the extraction of features from input data. Each operation computes or extracts something from the input data and/or previous layer in order to produce output data and/or next layer. Within A.I. networks there are fairly predefined operations, and there can be, e.g., hundreds or thousands of these operations. Such operations can represent such computational tasks as matrix multiplication and convolution, often using many pieces of input data from within the network.

SUMMARY

Conventional systems that provide access to content within a large content corpus typically have challenges creating high-quality recommendations of content when user accounts request content that is not available in the target content corpus. Various embodiments of a Title Engine described herein defines such unavailable content as "pseudo-content" and utilizes data generated from user account search queries and their interactions with substitute content in order to train a machine learning model(s) to create embeddings for similar content that is available in the content corpus.

Various embodiments of a Title Engine generate search results that identify content available in a content corpus in response to receiving a search query that requests content that is currently unavailable in the content corpus. In some embodiments, the Title Engine determines that requested content identified in a search query is not currently available (or accessible) in the content corpus. Rather than returning output merely indicating absence of the requested content set forth in the received search query, the Title Engine identifies various content available in the content corpus that is similar to the search query's requested—but unavailable—content.

Various embodiments described herein are directed to a Title Engine that identifies content in a content corpus that is similar to requested content that has been determined as unavailable. In some embodiments, the Title Engine receives a search query requesting particular content from a content corpus. The Title Engine determines whether the particular content requested in the search query is unavailable in the content corpus. Upon determining unavailability of the requested particular content in the content corpus, the Title Engine generates a pseudo-identifier for the requested particular content. The Title Engine inserts the pseudo-identifier into a sequence of content identifiers. The Title Engine generates an embedding for the pseudo-identifier.

In some embodiments, the Title Engine identifies previous search queries that match the search query requesting unavailable content. The previous matching search queries may be determined as matching based on an extent of similarity between the search query and the previous search queries. In other embodiments, the Title Engine determines an extent of similarity based on a match between the unavailable content being requested and types of content accessed by different user accounts that previously submitted the matching search queries. The Title Engine further generates search results responsive to the search query requesting unavailable content.

In some embodiments, sequences of content identifiers that each correspond to a different user account may include an instance of the same pseudo-identifier.

In various embodiments, the content corpus may represent a digital library that includes, for example, respective portions of digital books (i.e. eBooks), digital academic papers, audiobook files, and/or digital magazine articles. The digital library may further be a component(s) of an open publishing platform that implements the Title Engine.

Various embodiments of the Title Engine may include a module(s) and/or one or more functionalities to redact privacy information/data, to encrypt information/data and to anonymize data to ensure the confidentiality and security of user account and platform information/data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1:
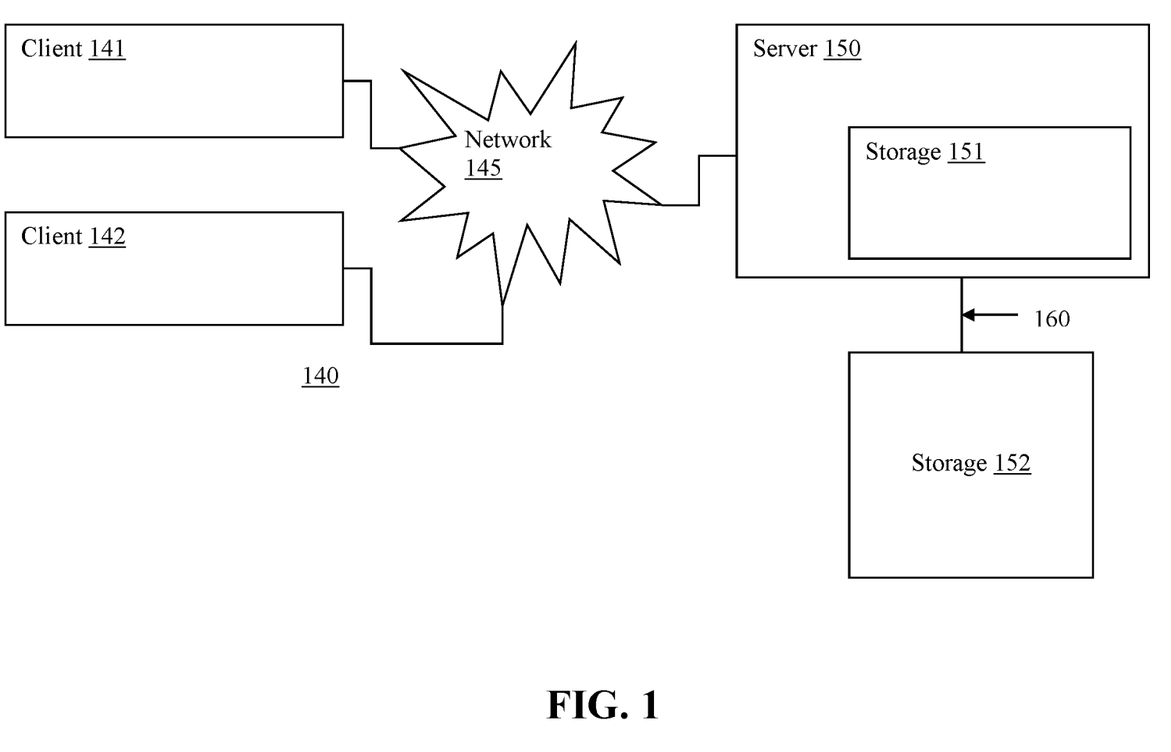
FIG. 1 is a diagram illustrating an exemplary environment in which some embodiments may operate.

A diagram of exemplary network environment in which embodiments may operate is shown in FIG. 1. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 2:
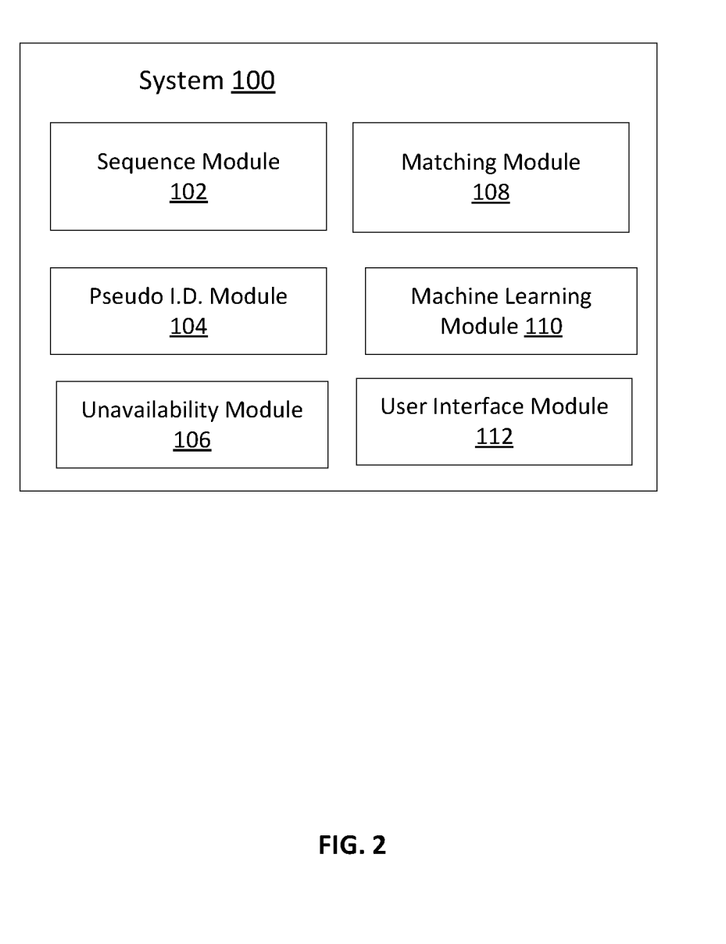
FIG. 2 is a diagram illustrating an exemplary environment in which some embodiments may operate.

FIG. 2 illustrates a block diagram of an example system 100 for a Title Engine that includes a sequence module 102, a pseudo-identifier module 104, an unavailability module 106, a matching module 108, a machine learning module 110 and an optional user interface (U.I.) module 112. The system 100 may communicate with various user devices to display output via the U.I. module 112.

The sequence module 102, of the system 100 may perform functionality as illustrated in FIGS. 3, 4, 5 and 6 ("FIGS. 3-6"). The sequence module 102 may generate, store, retrieve, collect, identify and analyze sequences of content identifiers.

The pseudo-identifier module 104, of the system 100 may perform functionality illustrated in FIGS. 3-6. The pseudo-identifier module 104 may generate pseudo-identifiers, insert pseudo-identifiers and identify pseudo-identifiers.

The unavailability module 106, of the system 100 may perform functionality illustrated in FIGS. 3-6. The unavailability module 106 may determine whether a search query request content that is unavailable in a content corpus and may determine neighbor content based on one or more search queries and sequences of content identifiers.

The matching module 108 of the system 100 may perform functionality as illustrated in FIGS. 3-6. The matching module 108 may determine an extant of similarity between search queries, pseudo-identifiers and various types of content.

The machine learning module 110 of the system 100 may perform functionality as illustrated in FIGS. 3-6. The machine learning module 110 may train and implement one or more machine learning networks to generating one or more embeddings.

The user interface module 116 of the system 100 may display information based on functionality as illustrated in FIGS. 3-6.

According to one or more embodiments of the Title Engine collects data to train a machine learning model(s) to build a unique embedding(s) for each identified unavailable content. For example, if a particular book title is included in a search query and is determined as being currently unavailable in the content corpus, the Title Engine builds a unique embedding for that particular book title. In some embodiments, the Title Engine utilizes an embedding for unavailable content identified in a search query to further be used to determine similar available content in the content corpus.

For training of a machine learning model(s), the Title Engine detects when various user accounts submit search queries requesting unavailable content during respective user account sessions and generates a pseudo-identifier for each particular content identified in the respective search queries. For example, if multiple user accounts submit search queries for the same piece of content (i.e. same Audiobook title) that is unavailable in the content corpus, the Title Engine generates a unique pseudo-identifier that corresponds to that piece of content (i.e. the Audiobook title). It is understood that the Title Engine further utilizes the unique pseudo-identifier in response to all subsequent search queries requesting that same piece of content (i.e. the Audiobook title).

In one or more embodiments, the Title Engine trains a machine learning model(s) with training data based on the sequences of content identifiers from various user accounts. The training data may be based on various sequences of content identifiers and interaction data associated with one or more user accounts that searched for the same unavailable content.

In various embodiments, the one or more user accounts may have previously submitted similar search queries for unavailable content. The Title Engine trains the machine learning model(s) to learn which content in the content corpus is similar to the unavailable content represented by a pseudo-identifier. The similarity between available content and unavailable content is surfaced by the machine learning model(s) on the basis of previous content selections (i.e. content reads) and various types of interactions by the various user accounts. The Title Engine processes the sequences of content identifiers to identify the types of available content accessed ("neighbor content") and types of interactions by various user accounts—that occurred within a time window-relative to occurrences of search queries for unavailable content. The Title Engine thereby determines the various neighbor content that is likely to be of interest to a user account that also submits a search query for a particular piece of content that is not available in the content corpus. The Title Engine further generates an embedding for each specific pseudo-identifier that corresponds to a particular piece of unavailable content.

In some embodiments, the Title Engine utilizes an embedding in order to generate search results. The Title Engine receives a search query from a user account for unavailable content that has previously been searched for by other user accounts. The Title Engine identifies a match between the current search query and previous search queries. The Title Engine identifies the pseudo-identifier for the unavailable content identified in the search query. For example, the content identified in the search query matches search query content already associated with a pseudo-identifier resulting from previous search queries from different users searching for the same unavailable content. The Title Engine identifies the embedding for the pseudo-identifier. The Title Engine utilizes the embedding to identify related content in the content corpus that is currently available. The Title Engine returns search results that include identification of the related content. In some embodiments, the Title Engine returns recommendations based on related content identified in the content corpus.

According to some embodiments of the Title Engine, content identifiers may each represent specific content (or portions of content) of a content corpus. The content corpus may represent a digital library that includes, for example, respective portions of digital books (i.e. eBooks), digital academic papers, audiobook files, sheet music and/or digital magazine articles. The digital library may further be a component(s) of an open online publishing platform ("publishing platform") that implements the Title Engine. In some embodiments, the content corpus, or a portion of the content corpus, may be a user-generated corpus that includes content uploaded by a plurality of user accounts.

Figure 3:
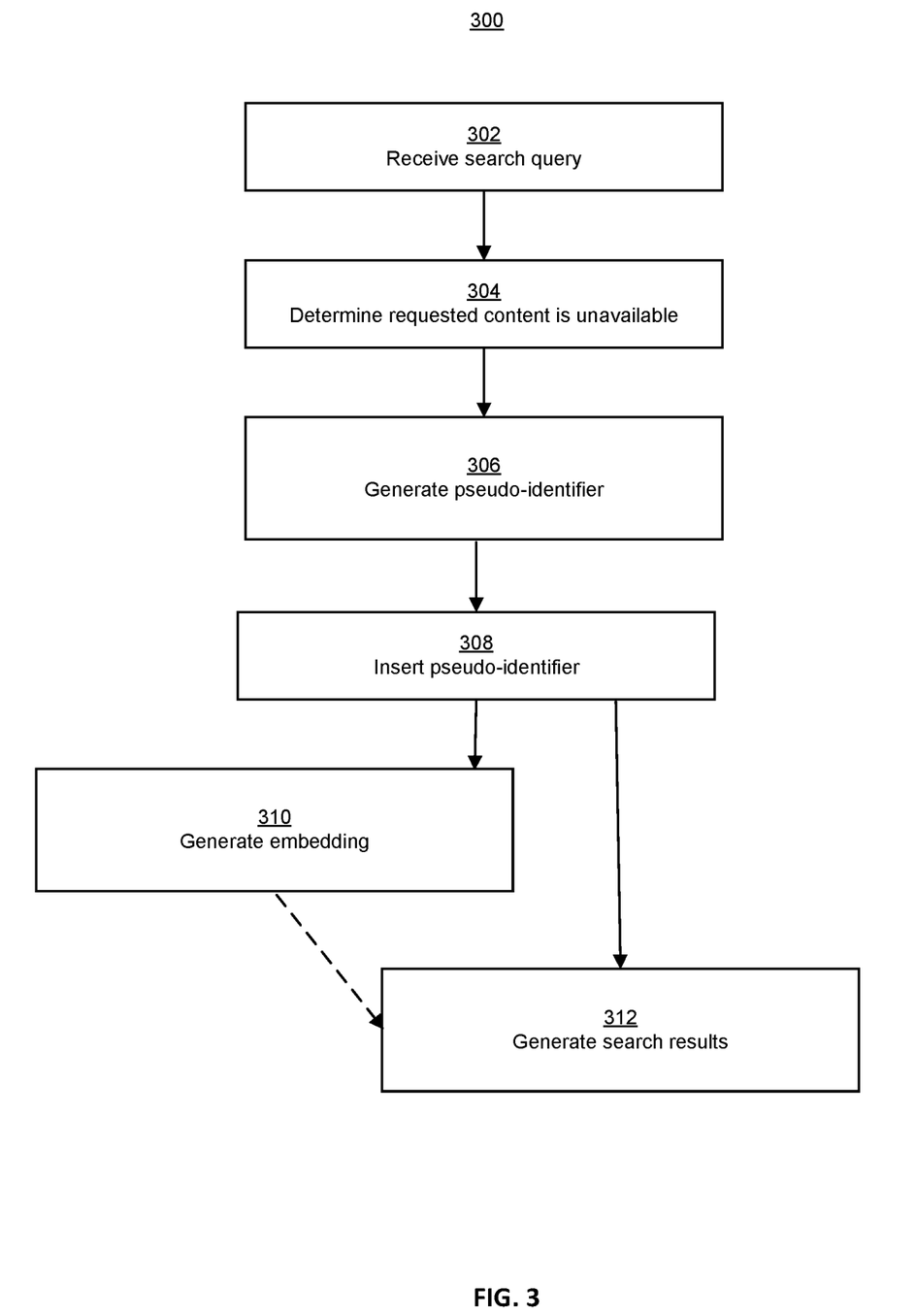
FIG. 3 is a diagram illustrating an exemplary environment in which some embodiments may operate.

As shown in exemplary flowchart 300 of FIG. 3, the Title Engine receives a search query, from a user account, for content submitted to a content corpus. (Step 302) The Title Engine determines the content identified in the search query is unavailable. (Step 304) The Title Engine generates a pseudo-identifier for the unavailable content identified in the search query. (Step 306) The Title Engine inserts the pseudo-identifier into a sequence of content identifiers, the sequence associated with the user account. (Step 308) The Title Engine generates an embedding for the pseudo-identifier. (Step 310) In an alternative to Step 310, the Title Engine utilizes the embedding to generate search results responsive to the user account's search query based on the neighbor content. (Step 312). It is understood that various embodiments of the Title Engine allow for the Step 310 to be performed prior to Step 312 as well.

In some embodiments, one or more user accounts of the publishing platform may access portions of content at various times. As such, as shown in exemplary diagram 400 of FIG. 4, a user account's access of the portions of content may be represented by a sequence of content identifiers 402, 404, 406, 408, 410, 412, where each content identifier corresponds to specific content. The sequence of content identifiers 402-412 thereby implicitly represents what type (s) of content a user account accessed and explicitly represents the order at which the user account accessed that content. Utilizing such sequences of content identifiers provides advantages over conventional systems whereby the Title Engine can extract inferences and predictions based on the access order of content that corresponds with the content identifiers without having to incur the processing and storage burden associated with accessing the actual content.

Figure 4:
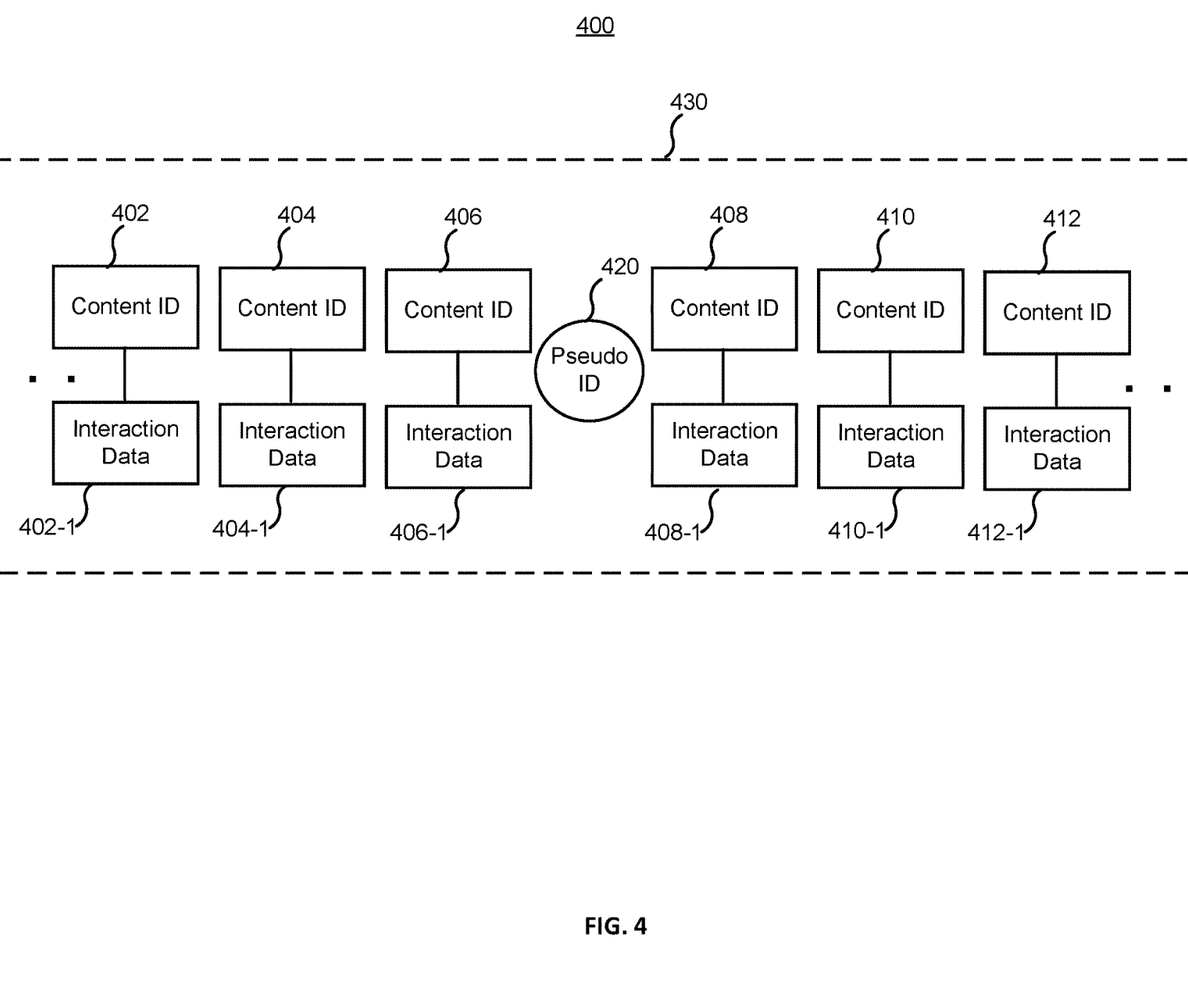
FIG. 4 is a diagram illustrating an exemplary method that may be performed in some embodiments.

A sequence of content identifiers 402-412 may further be augmented with interaction data 402-1, 404-1, 406-1, 408-1, 410-1, 412-1. In various embodiments, an instance(s) of interaction data may be associated with a particular content identifier 402, 404, 406, 408, 410, 412 in the sequence. Interaction data may represent that the user account selected the particular content (i.e. "clicked on" the particular content), spent time accessing or viewing the content, commented on or "liked" or "unliked" the content, shared the particular content, saved, and/or downloaded the particular content. Interaction data may represent various types of user account activity as well. It is understood that any content identifier, in a sequence of content identifiers for a specific user account, may itself be associated with one or more instances of varying types of interaction data.

Each user account may be associated with multiple sequences of content identifiers, whereby each sequence corresponds to a particular user account session of the publishing platform. A session may be initiated when a user account accesses (i.e. "logs onto") the publishing platform. Some sessions may include interaction data indicating one or more search queries submitted by the user account.

While a user account(s) searches for an unavailable portion of content during a session 430, the Title Engine detects the search query(s) for unavailable content submitted by the user account. The Title Engine creates (or identifies) a content identifier 420 for the unavailable content (hereinafter "pseudo identifier") in the search query. The Title Engine inserts the pseudo identifier 420 into a sequence of content identifiers 402-412 that is being created by the Title Engine to represent the user account's activity on the publishing platform during the current session 430.

The Title Engine inserts the pseudo identifier 420 at a position in the sequence of content identifiers 402-412 that reflects a time of the search query in relation to other types of activity by the user account. For example, the user account may access first content and later access second content during the same session 430. The user account may have submitted the search query at a time that occurs between the access times of the first and second content. The Title Engine thereby inserts the pseudo identifier 420 at a position in the sequence of content identifiers 402-412 that is between a position for a first content identifier 406 representing the first content and a position for a second content identifier 408 representing the second content.

As multiple, different user accounts submit search queries for the same unavailable content over the course of different sessions, each user account may be associated with one or more sequences of content identifiers that includes the same pseudo-identifier. Content identifiers positioned proximate to the various positions of the pseudo-identifier in the user accounts' sequences of content identifiers may thereby reflect content that is related to the unavailable content associated with the pseudo-identifier.

A subset of those user accounts may submit a search query requesting that same unavailable content. The Title Engine utilizes the same pseudo-identifier for the particular unavailable content with respect to the corresponding search queries from the subset of user accounts.

In some embodiments, the Title Engine utilizes an embedding associated with a pseudo-identifier to identify related content in the content corpus that is currently available. Such related content is referenced as neighbor content. Neighbor content is content that is available in the content corpus that is similar to requested unavailable content associated with a pseudo-identifier.

In some embodiments, in response to receipt of a search query requesting unavailable content, the Title Engine returns search results that include identification(s) of respective neighbor content. In some embodiments, the Title Engine returns recommendations based on available neighbor content identified in the content corpus.

In various embodiments, the Title Engine builds an embedding for a particular pseudo-identifier. The Title Engine collects training data based on sequences of content identifiers that include the same pseudo-identifier and feeds the training data into a machine learning model(s). For example, the machine learning model(s) may be a Word 2 Vec model and/or a Light FM model. The machine learning model(s) generates an embedding for the particular pseudo-identifier.

When the Title Engine receives a subsequent search query from a user account for the unavailable content, the Title Engine identifies a pseudo-identifier for the unavailable content identified in the current search query. The Title Engine inserts an embedding associated with the pseudo-identifier to determine neighbor content in the content corpus. The Title Engine returns search results that include identification of at least a portion of the neighbor content.

In some embodiments of the Title Engine thereby model user account searches that request unavailable content as positive interactions in a collaborative filtering matrix. For example, the Title Engine my train an LightFM algorithm to obtain embeddings for content that does not have any semantic embeddings or user interactions. The Title Engine may further utilize embeddings for unavailable content (associated with pseudo identifiers) in order to retrieve neighbor content and build and push recommendations based on the retrieved neighbor content.

Figure 5:
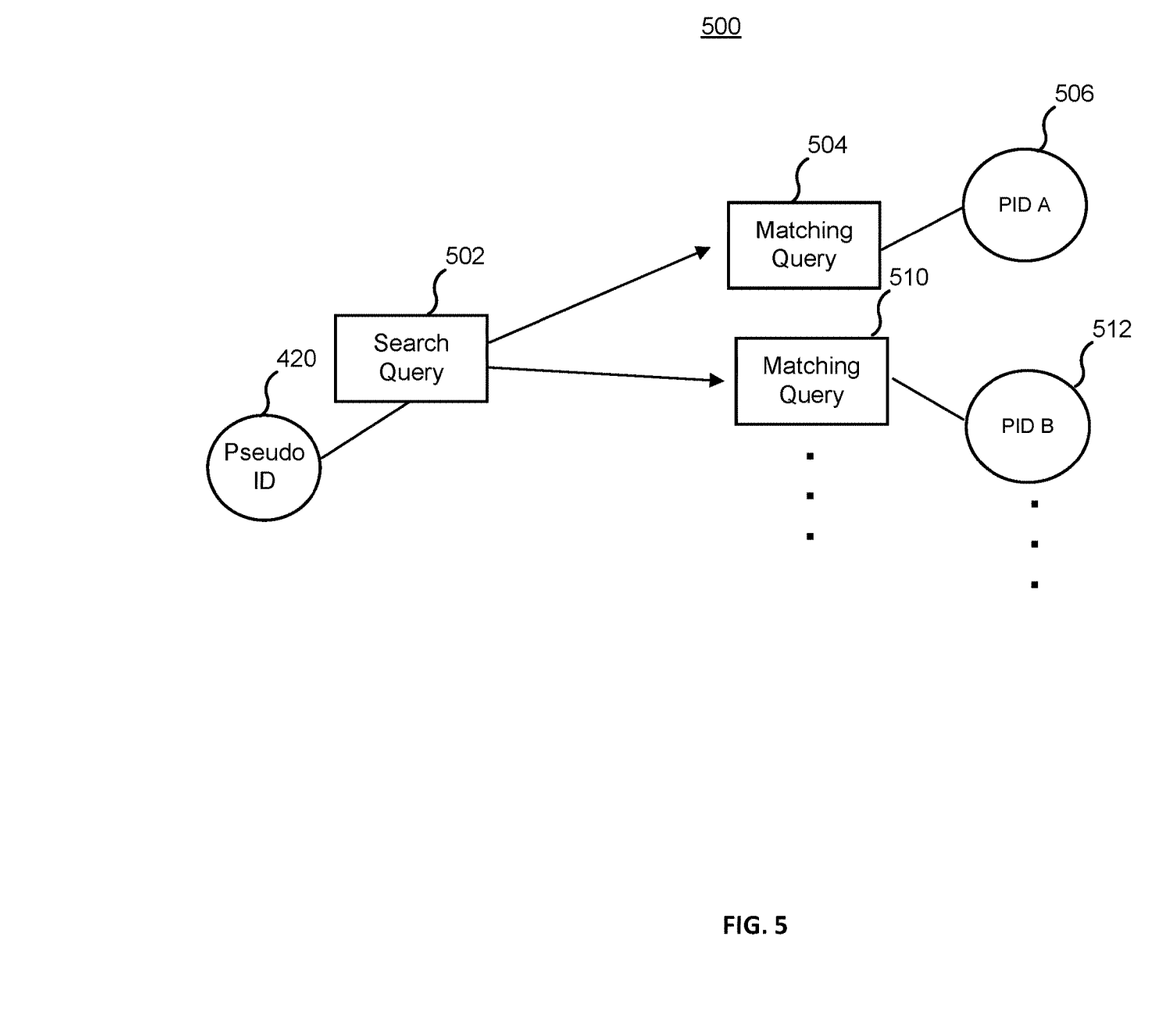
FIG. 5 is a diagram illustrating an exemplary environment in which some embodiments may operate.

As shown in exemplary diagram 500 of FIG. 5, in some embodiments, the Title Engine utilizes an embedding associated with a pseudo-identifier to identify related content in the content corpus that is currently available. Such related content is referenced as neighbor content. Neighbor content is content that is available in the content corpus, which is similar to requested unavailable content associated with a pseudo-identifier. That is, in response to receipt of a search query requesting unavailable content 502, the Title Engine returns search results that include identification(s) of respective neighbor content. In some embodiments, the Title Engine returns recommendations based on available neighbor content identified in the content corpus.

In response to the search query 502, the Title Engine identifies previous matching search queries 504, 510 from one or more of the different user accounts. The matching search queries 504, 510 are search queries previously submitted by different user accounts prior to receipt of the search query 502. The matching search queries each correspond to a unique pseudo-identifier 506, 512. The Title Engine identifies the search queries 504, 510 by determining one or more of the previously received queries 504, 510 match the search query 502 within a threshold of similarity. Is it understood that there can be any number of matching search queries.

Figure 6:
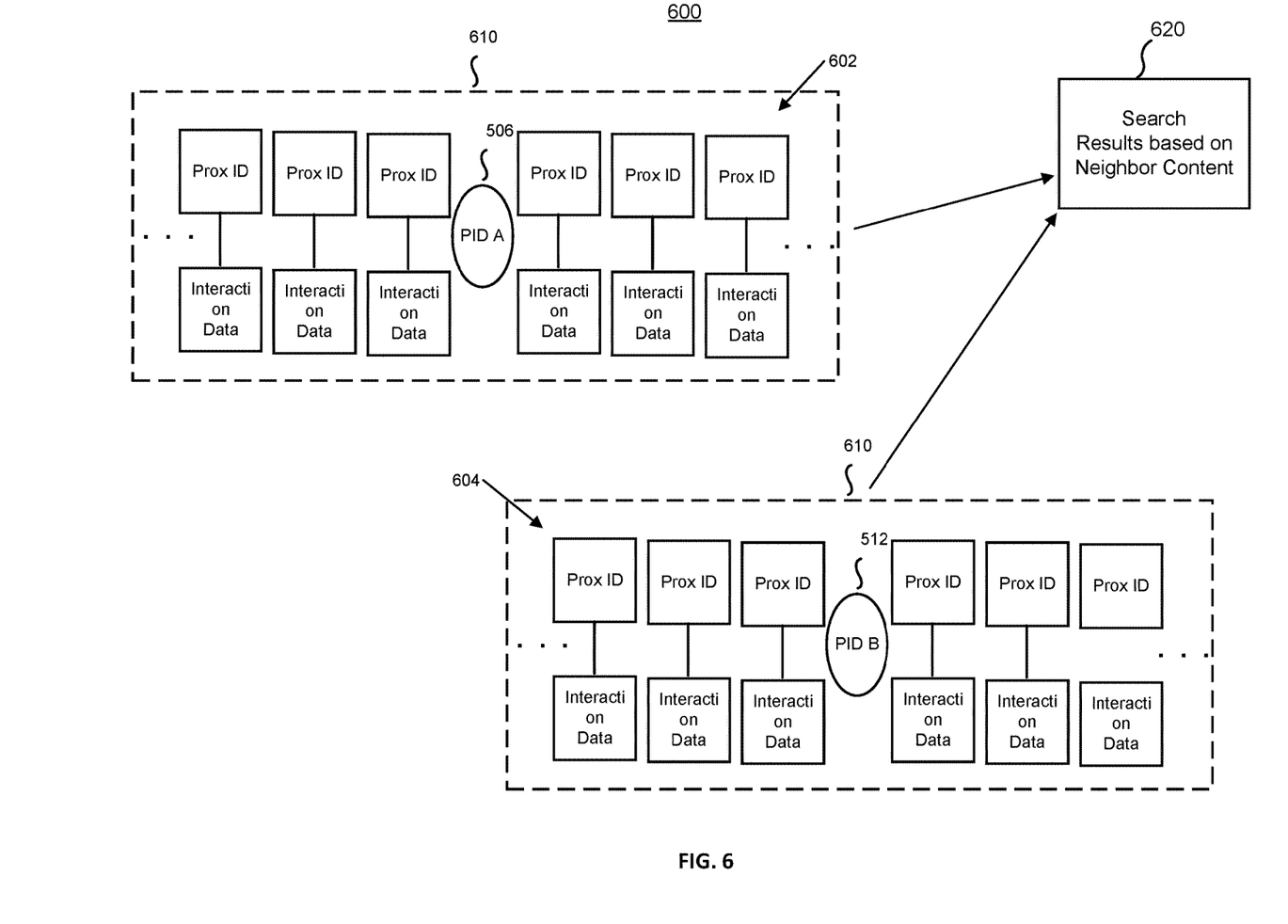
FIG. 6 is a diagram illustrating an exemplary environment in which some embodiments may operate.

As shown in exemplary diagram 600 of FIG. 6, upon identifying the matching search queries 504, 510, the Title Engine identifies a plurality of sequences of content identifiers 602, 604. Each of the identified sequences 602, 604 corresponds to a unique pseudo-identifier 506, 512 previously inserted into the sequences 602, 604. Placement of the pseudo-identifier 506, 512 in the sequences is related to the when the matching search queries 504, 510 were received. Is it understood that there can be any number of identified sequence of content identifiers utilized by the Title Engine to generate search results for a received search query.

For each identified sequence 602, 604, the Title Engine identifies content interactions and identifiers placed in the identified sequences 602, 604 that occurred within a particular time range 610 from an instance of a pseudo-identifier 506, 512 that was generated in response to receipt of the matching search queries 504, 510. By searching for such content interactions and identifiers proximate to a position of the pseudo-identifier 506, 512 in the sequence 602, 604, the Title Engine implements the assumption that the content accessed by the different user accounts is likely content similar to the unavailable content requested by the search query 502 because those content access events occurred near a time those different user accounts submitted the matching search queries 504, 510—as evidence by placement of the pseudo-identifier 506, 512 in the sequence 602, 604.

The Title Engine identifies the content interactions and identifiers proximate to a position of the pseudo-identifier 506, 512 (i.e. within the particular time range) as identifying neighbor content. The Title Engine generates search results 620 responsive to the user account's search query 502 based on the neighbor content.

In this specification, reference is made in detail to specific embodiments of the invention. Some of the embodiments or their aspects are illustrated in the drawings.

It is understood that any discussion, description, elaboration and illustration included herein may be represented in whole or at least in part by data and may be embodied and/or processed according to one or more computer software modules and/or computer hardware modules.

Additionally, any discussion, description, elaboration and illustration included herein may be implemented on a non-transitory computer readable medium, a computer system and/or a computer program product.

Further areas of applicability of the present disclosure will become apparent from the detailed description, the claims and the drawings. The detailed description and specific examples are intended for illustration only and are not intended to limit the scope of the disclosure.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 7:
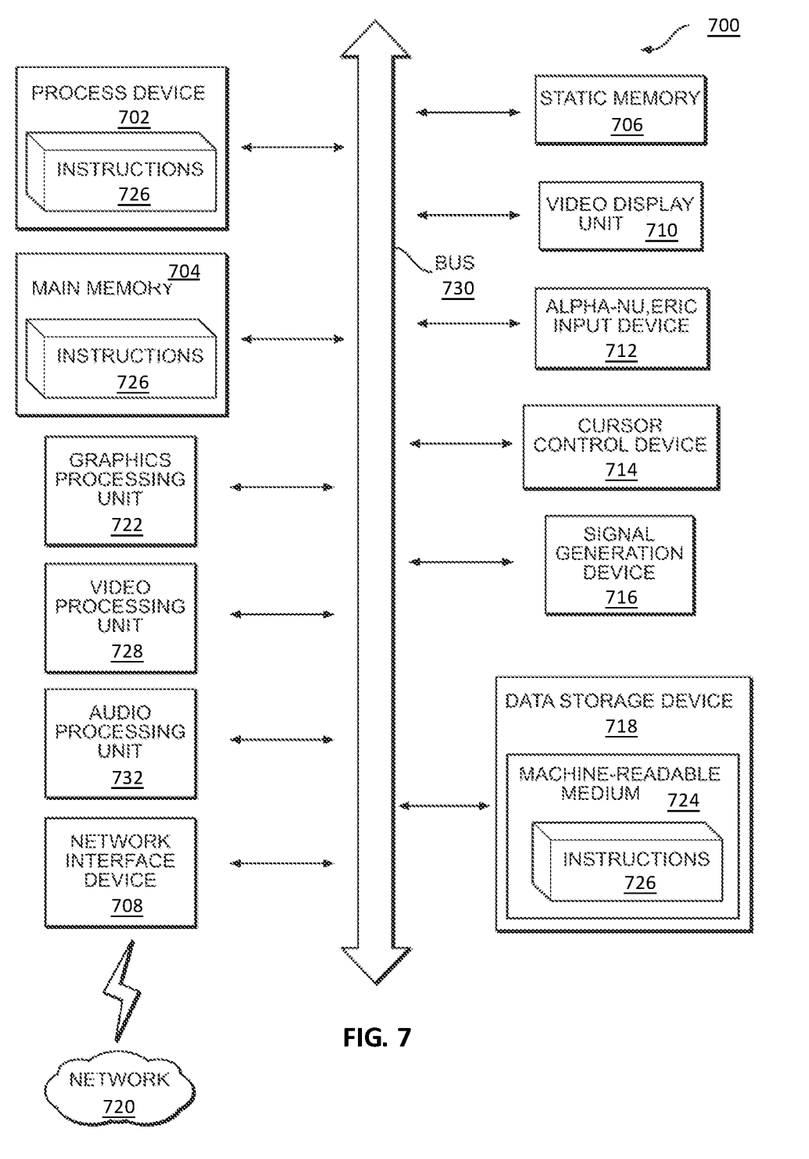
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a smartphone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   receiving a search query, from a user account, for content submitted to a content corpus;
   determining the content identified in the search query is unavailable;
   generating a pseudo-identifier for the unavailable content identified in the search query;
   inserting the pseudo-identifier into a sequence of content identifiers, the sequence associated with the user account;
   generating an embedding for the pseudo-identifier;
   identifying, via the embedding, a plurality of sequences of content identifiers, wherein a respective sequence corresponds to a different user account that previously sent a search query for the unavailable content identified by the pseudo-identifier;
   for one or more of the respective sequences identified via the embedding:
   (i) determining content interactions that occurred within a particular time range from an instance of the pseudo-identifier placed in the respective sequence, each of the determined content interactions associated with a proximate content identifier; and
   (ii) identifying neighbor content from at least a portion of the proximate content identifiers;
   generating search results responsive to the user account's search query based on the neighbor content.

2. The computer-implemented method of claim 1, wherein each content identifier uniquely identifies a different portion of content accessed by the user account; and
   wherein the sequence of content identifiers orders the content identifiers according to an access time by the user account of each respective content identifier.

3. The computer-implemented method of claim 1, further comprising:
   generating, via the embedding, search results responsive to the search query from the user account, the search results including at least one recommendation of similar content, the similar content comprising content available in the content corpus and similar to the unavailable content identified in the search query.

4. The computer-implemented method of claim 1, wherein identifying a plurality of sequences of content identifiers further comprises:
   identifying previous matching search queries from one or more of the different user accounts that match the search query from the user account within a threshold of similarity;
   identifying respective different pseudo-identifiers that correspond to the previous matching search queries; and
   identifying a plurality of sequence content identifiers, wherein a respective sequence includes an instance of at least one of the respective different pseudo-identifiers.

5. The computer-implemented method of claim 1, wherein at least a portion of the content corpus comprises content uploaded from a first user account for access by a plurality of user accounts.

6. A system comprising one or more processors, and a non-transitory computer-readable medium including one or more sequences of instructions that, when executed by the one or more processors, cause the system to perform operations comprising:
   receiving a search query, from a user account, for content submitted to a content corpus;
   determining the content identified in the search query is unavailable;
   generating a pseudo-identifier for the unavailable content identified in the search query;

inserting the pseudo-identifier into a sequence of content identifiers, the sequence associated with the user account;

generating an embedding for the pseudo-identifier;

identifying, via the embedding, a plurality of sequences of content identifiers, wherein a respective sequence corresponds to a different user account that previously sent a search query for the unavailable content identified by the pseudo-identifier;

for one or more of the respective sequences identified via the embedding:
  (i) determining content interactions that occurred within a particular time range from an instance of the pseudo-identifier placed in the respective sequence, each of the determined content interactions associated with a proximate content identifier; and
  (ii) identifying neighbor content from at least a portion of the proximate content identifiers;

generating search results responsive to the user account's search query based on the neighbor content.

7. The system of claim 6, wherein each content identifier uniquely identifies a different portion of content accessed by the user account; and
  wherein the sequence of content identifiers orders the content identifiers according to an access time by the user account of each respective content identifier.

8. The system of claim 6, further comprising:
generating, via the embedding, search results responsive to the search query from the user account, the search results including at least one recommendation of similar content, the similar content comprising content available in the content corpus and similar to the unavailable content identified in the search query.

9. The system of claim 6, wherein identifying a plurality of sequences of content identifiers further comprises:
  identifying previous matching search queries from one or more of the different user accounts that match the search query from the user account within a threshold of similarity;
  identifying respective different pseudo-identifiers that correspond to the previous matching search queries; and
  identifying a plurality of sequence content identifiers, wherein a respective sequence includes an instance of at least one of the respective different pseudo-identifiers.

10. The system of claim 6, wherein at least a portion of the content corpus comprises content uploaded from a first user account for access by a plurality of user accounts.

11. A computer program product comprising a non-transitory computer-readable medium having a computer-readable program code embodied therein to be executed by one or more processors, the program code including instructions to:
  receiving a search query, from a user account, for content submitted to a content corpus;
  determining the content identified in the search query is unavailable;
  generating a pseudo-identifier for the unavailable content identified in the search query;
  inserting the pseudo-identifier into a sequence of content identifiers, the sequence associated with the user account;
  generating an embedding for the pseudo-identifier;
  identifying, via the embedding, a plurality of sequences of content identifiers, wherein a respective sequence corresponds to a different user account that previously sent a search query for the unavailable content identified by the pseudo-identifier;
  for one or more of the respective sequences identified via the embedding:
    (i) determining content interactions that occurred within a particular time range from an instance of the pseudo-identifier placed in the respective sequence, each of the determined content interactions associated with a proximate content identifier; and
    (ii) identifying neighbor content from at least a portion of the proximate content identifiers;
  generating search results responsive to the user account's search query based on the neighbor content.

12. The computer program product of claim 11, wherein each content identifier uniquely identifies a different portion of content accessed by the user account; and
  wherein the sequence of content identifiers orders the content identifiers according to an access time by the user account of each respective content identifier.

13. The computer program product of claim 11, further comprising:
  generating, via the embedding, search results responsive to the search query from the user account, the search results including at least one recommendation of similar content, the similar content comprising content available in the content corpus and similar to the unavailable content identified in the search query.

14. The computer program product of claim 11, wherein identifying a plurality of sequences of content identifiers further comprises:
  identifying previous matching search queries from one or more of the different user accounts that match the search query from the user account within a threshold of similarity;
  identifying respective different pseudo-identifiers that correspond to the previous matching search queries; and
  identifying a plurality of sequence content identifiers, wherein a respective sequence includes an instance of at least one of the respective different pseudo-identifiers.

* * * * *